UNITED STATES PATENT OFFICE.

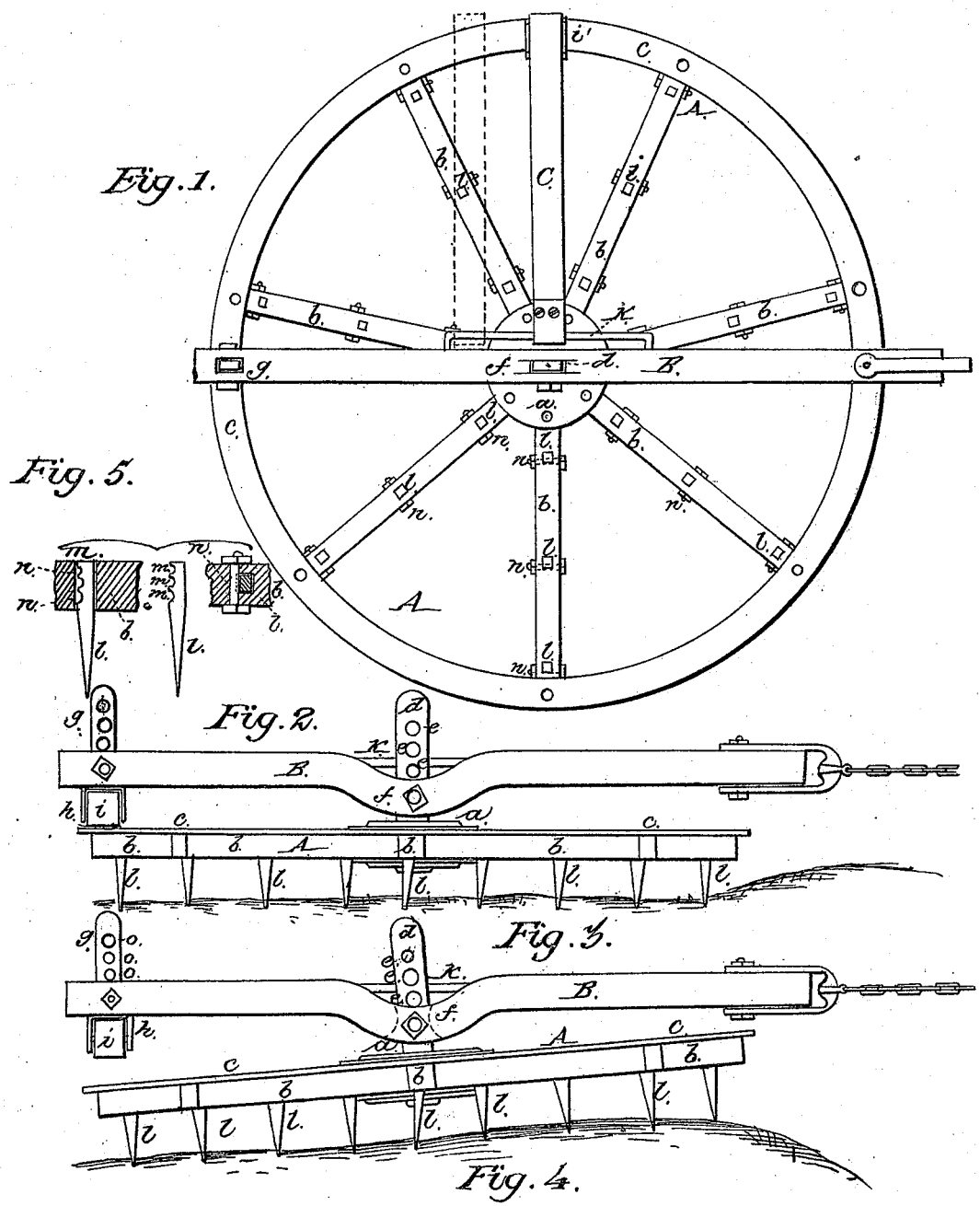

H. H. MONROE, OF THOMASTON, MAINE.

IMPROVEMENT IN ROTARY HARROWS.

Specification forming part of Letters Patent No. 43,700, dated August 2, 1864.

*To all whom it may concern:*

Be it known that I, H. H. MONROE, of Thomaston, in the county of Knox and State of Maine, have invented certain new and useful Improvements in Revolving Harrows; and I do hereby declare that the following is a full and exact description thereof, reference being had to the accompanying drawings, making part of this specification.

Figure 1 is a plan of my improved harrow; Fig. 2, a side elevation of the same; Fig. 3, a similar elevation, but showing the harrow passing over a small elevation in the ground; Fig. 4, a view of the jointed side arm sustaining one of the weighted rollers or wheels detached; Fig. 5, views showing the manner of securing and holding the drag-teeth in the frame.

Like letters of reference indicate corresponding parts in all the figures.

My invention is an improvement on that class of harrows which revolve around a center by means of a weighted roller or rollers resting on the rim.

In the accompanying drawings, A represents a circular harrow, having a central hub, $a$, and a suitable number of radial arms, $b\ b$, secured at the outer ends to an iron rim, $c$. The hub turns on a bearing forming a swivel-joint, as usual, and this bearing extends upward a suitable height, constituting a standard, $d$, provided with adjusting-holes, $e\ e$, to which is secured the beam B. The construction of this beam and its arrangement relatively to the harrow and the bearing $d$ are somewhat peculiar. Instead of being made straight, as in the ordinary manner, and resting down closely to the top of the harrow proper, the middle portion, which connects with the bearing or standard, is formed into a downward curve or bend, $f$, so as to bring the bottom of the same near the harrow, while the ends of the beam are elevated at some distance above it. By means of the adjusting-holes $e\ e$ in the standard the beam can be raised to any height desired. The special object of this arrangement is to allow the harrow proper a free vertical action independent of the beam, so as to adapt itself to the irregularities of the ground. In the ordinary arrangement of harrows of this kind the beam is straight and rests closely on top the harrow and has to rise and fall with it. For instance, in passing over a small ridge, wave, or elevation of the ground, of not greater width than the harrow, as shown in Fig. 3, the horses having already passed the ridge, and the chain being taut, there is no alternative but for the harrow to plow deeply through the ridge, thus adding great strain and resistance to the draft without accomplishing any useful purpose; and in passing down the opposite side of the ridge the harrow will not strike the level ground till some distance has been passed over. In my arrangement, the ends of the beam being elevated above the harrow, the latter is allowed to rise or fall in either direction vertically, independently of the beam, so that in passing over a ridge or small elevation (as in Fig. 3) it does not plow deeply through, but inclines upward, and in passing down on the opposite side it inclines downward, thus not only doing the work better, but lessening the strain; and, while this advantage is attained, the beam may be jointed as closely to the top of the harrow as in the old arrangement, and the harrow revolves as perfectly.

Through the rear end of the beam passes the shank $g$ of a bearing, $h$, that sustains a weighted roller or friction-wheel, $i$, resting on the rim $c$, by which means the rotary motion is communicated to the harrow. This shank has also adjusting-holes $o\ o$. A similar device is used on one or both sides of the beam, at right angles to the same. In this case the roller or wheel $i'$ rests in a bearing, $h'$, secured to an arm, C, which extends inward and is jointed to a horizontal joint rod or bar, $k$, attached to the side of the beam, as clearly represented in Figs. 1 and 4. The joint is such that not only may the arm be turned up in a vertical position when it is desirable to not use it, but it can also slide forward and backward longitudinally of the beam in various positions, as indicated by the black and red outlines in Fig. 1. The advantage of this arrangement is that I can apply the pressure of the roller $i$—whenever it may be most desirable or advantageous to adapt it to the kind or condition of ground which is being harrowed—either in the rear, where the pressure of the two rollers will be concentrated, or forward, so as to separate them as much as possible, and thus balance the action of the harrow. In addition to this, this device is very desirable in connection with the beam constructed and arranged as described; for in passing over a ridge or elevation, as shown in Fig. 3, the rear roller, $i$, will be raised from the harrow, and consequently the latter ceases its rotary motion at the time, unless the side roller bears, which is the case, as it is jointed in such a manner as to rise and fall, and consequently always rests on the rim c.

I prefer to set the teeth l l in the arms b b in a slightly angular position, as indicated at the center in Figs. 2 and 3, in order to facilitate the rotary motion of the harrow. The shank of each tooth, or that portion which rests in the wood, is provided on one corner or side with a set of adjusting-notches, m m, Fig. 5, through any one of which passes a bolt, n, transversely through the arm b, and secured on opposite sides by means of a head and nut, or in any equivalent manner. There are several advantages resulting from this arrangement: First, the projection of the teeth can be increased or diminished at pleasure by shifting the bolt n from one notch m to another, either higher or lower; second, the tooth is always retained in place, so that there is no danger of its dropping out and getting lost when the wood shrinks, as in the ordinary harrow; and, third, the bolt passing transversely through the arm b, and secured on each side, prevents the latter from splitting or becoming broken from the great strain it receives.

What I claim as my invention, and desire to secure by Letters Patent, is—

1. The beam B, provided with the bend f, and having its ends elevated, in combination with the harrow A and bearing d, arranged and operating substantially as herein set forth.

2. In combination with the beam B, harrow A, and bearing d, the elongated joint-rod k and the hinged arm C, provided with the weighted roller i', so arranged that the position of said roller on the rim may be varied, substantially as herein specified.

In witness whereof I have hereunto signed my name in the presence of two subscribing witnesses.

H. H. MONROE.

Witnesses:
 JOSEPH FARWELL,
 GEORGE THORNDIKE.